United States Patent
Berg et al.

(10) Patent No.: US 10,126,027 B2
(45) Date of Patent: Nov. 13, 2018

(54) METHOD AND CONTROL DEVICE FOR OPTIMIZING COOLING OF A HIGH VOLTAGE ACCUMULATOR BY MEANS OF AN AIR-CONDITIONING SYSTEM

(71) Applicant: Bayerische Motoren Werke Aktiengesellschaft, Munich (DE)

(72) Inventors: Karsten Berg, Starnberg (DE); Alexander Meijering, Munich (DE); Marc-Thomas Eisele, Munich (DE); Sebastian Siering, Munich (DE); Nicolas Flahaut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 238 days.

(21) Appl. No.: 14/971,826

(22) Filed: Dec. 16, 2015

(65) Prior Publication Data

US 2016/0102894 A1 Apr. 14, 2016

Related U.S. Application Data

(63) Continuation of application No. PCT/EP2014/061425, filed on Jun. 3, 2014.

(30) Foreign Application Priority Data

Jun. 17, 2013 (DE) .................. 10 2013 211 259

(51) Int. Cl.
*F25B 39/00* (2006.01)
*B60H 1/00* (2006.01)
(Continued)

(52) U.S. Cl.
CPC ......... *F25B 39/00* (2013.01); *B60H 1/00278* (2013.01); *B60L 11/1874* (2013.01);
(Continued)

(58) Field of Classification Search
CPC ............ B60H 1/00271; B60H 1/00278; B60H 1/00385; B60H 1/00392; B60H 1/00878;
(Continued)

(56) References Cited

U.S. PATENT DOCUMENTS 3,430,453 A 3/1969 Norton
3,759,056 A 9/1973 Graber
(Continued)

FOREIGN PATENT DOCUMENTS

CN 101107743 A 1/2008
CN 101279580 A 10/2008
(Continued)

OTHER PUBLICATIONS

PCT/EP2014/061425, International Search Report dated Sep. 3, 2014 (Two (2) Pages).
(Continued)

*Primary Examiner* — Marc Norman
(74) *Attorney, Agent, or Firm* — Crowell & Moring LLP

(57) ABSTRACT

A control device, and a method for operating the control device, optimizes cooling of a high-voltage accumulator using an air-conditioning system in a vehicle. A coolant flow which is insufficient is detected by an evaporator for the high-voltage accumulator and, as a result, heat losses inside a condenser of the air-conditioning system are reduced for increasing the flow of the coolant.

17 Claims, 4 Drawing Sheets

(51) Int. Cl.
*H01M 10/625* (2014.01)
*H01M 10/633* (2014.01)
*H01M 10/663* (2014.01)
*H01M 10/6569* (2014.01)
*H01M 10/617* (2014.01)
*H01M 10/613* (2014.01)
*B60L 11/18* (2006.01)
*H01M 10/635* (2014.01)
*F25B 39/02* (2006.01)

(52) U.S. Cl.
CPC ....... *H01M 10/613* (2015.04); *H01M 10/617* (2015.04); *H01M 10/625* (2015.04); *H01M 10/633* (2015.04); *H01M 10/6569* (2015.04); *H01M 10/663* (2015.04); *B60H 2001/00307* (2013.01); *F25B 39/02* (2013.01); *H01M 10/635* (2015.04); *Y02T 10/705* (2013.01); *Y02T 10/7011* (2013.01)

(58) Field of Classification Search
CPC ... B60H 2001/00307; F25B 2400/0403; F25B 2500/24; F25B 2600/111; H01M 10/613; H01M 10/617; H01M 10/625; H01M 10/6569; H01M 10/663; B60L 11/1874
USPC ........................................ 62/196.4, 199, 200
See application file for complete search history.

(56) References Cited

U.S. PATENT DOCUMENTS

| | | | | |
|---|---|---|---|---|
| 3,958,429 A * | 5/1976 | Kirsch | ................. | F25B 49/027 62/184 |
| 6,047,770 A | 4/2000 | Suzuki et al. | | |
| 6,138,466 A | 10/2000 | Lake et al. | | |
| 6,205,803 B1 * | 3/2001 | Scaringe | ................... | F25B 5/02 165/104.33 |
| 9,347,700 B2 * | 5/2016 | Bush | ......................... | F24F 1/06 |
| 2008/0229764 A1 * | 9/2008 | Taras | ...................... | F24F 3/153 62/90 |
| 2009/0249802 A1 | 10/2009 | Nemesh et al. | | |
| 2011/0206967 A1 * | 8/2011 | Itsuki | ...................... | B60K 1/04 429/120 |

FOREIGN PATENT DOCUMENTS

| | | |
|---|---|---|
| CN | 102050007 A | 5/2011 |
| CN | 103129348 A | 6/2013 |
| DE | 1 601 051 A | 5/1970 |
| DE | 2 333 678 A | 1/1974 |
| DE | 38 77 752 T2 | 5/1993 |
| DE | 198 33 251 A1 | 1/1999 |
| DE | 199 30 148 A1 | 1/2000 |
| DE | 103 48 702 A1 | 5/2005 |
| DE | 10 2004 036 772 B3 | 3/2006 |
| DE | 10 2009 015 653 A1 | 11/2009 |
| EP | 0 355 180 A2 | 2/1990 |
| EP | 2 072 296 A1 | 6/2009 |
| WO | WO 2012/003209 A1 | 1/2012 |
| WO | WO 2013/003843 A2 | 1/2013 |

OTHER PUBLICATIONS

German Search Report issued in counterpart application No. DE 10 2013 211 259.9 dated Mar. 31, 2014, with Statement of Relevancy (Six (6) pages).
Chinese Office Action issued in Chinese counterpart application No. 201480029162.6 dated Sep. 5, 2016, with English translation (Fourteen (14) pages).
Chinese Office Action issued in Chinese counterpart application No. 201480029162.6 dated May 15, 2017, with partial English translation (Five (5) pages).

\* cited by examiner

METHOD AND CONTROL DEVICE FOR OPTIMIZING COOLING OF A HIGH VOLTAGE ACCUMULATOR BY MEANS OF AN AIR-CONDITIONING SYSTEM

CROSS REFERENCE TO RELATED APPLICATIONS

This application is a continuation of PCT International Application No. PCT/EP2014/061425, filed Jun. 3, 2014, which claims priority under 35 U.S.C. § 119 from German Patent Application No. 10 2013 211 259.9, filed Jun. 17, 2015, the entire disclosures of which are herein expressly incorporated by reference.

BACKGROUND AND SUMMARY OF THE INVENTION

The present invention relates to the cooling of high-voltage batteries in vehicles that can be electrically driven. In particular, the present invention relates to improvements in the control of a refrigerant flow through the evaporator which is set up for cooling the high-voltage accumulator.

Specifically, in electric vehicles and hybrid vehicles, lithium-ion batteries are very commonly used as energy stores. In this case, the thermal management of lithium-ion batteries is an important factor for the service life and the power output of the battery. For example, the spread of the temperature between the battery cells must not exceed a certain differential value, while at the same time, a maximum temperature of all of the cells must be adhered to. These requirements must be met even in the presence of large fluctuations in the outside temperature range. For example, for automobiles, a requirement may be that the lithium-ion batteries are available with full function in an outside temperature range from −10° to +40° C.

In the presence of cold temperatures below the freezing point, critical states may arise in a refrigeration circuit, which can lead to inadequate cooling or to an exceedance of the above limit values. Since, under winter conditions, there is always a very small pressure gradient in the refrigeration circuit, there is correspondingly a very small mass flow of cooling fluid. Given a constant refrigeration power of a cooler, intense overheating of the cooling fluid thus occurs. Said overheating however leads to a large spread in the temperature distribution within the battery cells, as the temperature of the cooling fluid differs considerably between the inlet and the outlet of the cooler. For example, intense overheating of the battery cells arranged furthest downstream in the cooling circuit may result.

It is therefore an object of the present invention to ensure reliable operation of a high-voltage accumulator that is cooled by way of an air-conditioning system, even in the presence of low ambient temperatures.

One embodiment of the invention proposes a method for optimizing the cooling of a high-voltage accumulator by way of an air-conditioning system in a transportation means. In this case, the transportation means may for example be a passenger motor vehicle, which in particular can be electrically driven. Other transportation means which can be driven by way of an electrochemical high-voltage accumulator are however likewise conceivable. Here, the method according to an embodiment of the invention encompasses, as a first step, and identification of an excessively low refrigerant flow through an evaporator for the high-voltage accumulator. In this case, an excessively low refrigerant flow leads (as described in the introduction) to a low dissipation of heat, and in particular to a large spread of the temperature distribution within the accumulator cells of the high-voltage accumulator. In response thereto, as a second step, there is proposed an in particular automatic reduction of heat losses within a condenser of the air-conditioning system in order to increase the refrigerant flow. Since it is the case in particular in the presence of low outside temperatures that the refrigerant flow drastically decreases owing to an excessively low temperature difference in the region of the condenser, it is possible in this way for the temperature difference to be increased, and for adequate cooling of the high-voltage accumulator by way of an evaporator which is thermally coupled to the high-voltage accumulator to be ensured. For a reduction in heat losses, use may be made, according to the invention, of various measures which are performed preferably without separate user interaction, that is to say automatically. In this case, in the context of the invention, a "heat loss" of the condenser is to be understood in particular to mean the heat loss balance within the condenser. In other words, according to the invention, an increased output of heat from the condenser can be compensated by way of an increased supply of heat. Here, in the context of the possible measures, possibilities are preferably favored which permit inexpensive and operationally reliable implementation in a series-production environment.

The subclaims relate to preferred refinements of the invention.

It is preferably the case that the excessively low refrigerant flow is identified in response to various findings. A first possibility consists in determining an exceedance of a predefined temperature within the high-voltage accumulator. For this purpose, various methods are conceivable which are basically known in the prior art. For example, a measurement of electrical characteristic variables of the high-voltage accumulator, an evaluation of a thermal element, an evaluation of an infrared sensor or the like are possible according to the invention. Estimating methods based on empirical values may also be used, taking into consideration an operating state of the transportation means and/or of the high-voltage accumulator. Alternatively or in addition, it is similarly possible for an exceedance of a predefined temperature spread between accumulator cells within the high-voltage accumulator to be determined. In other words, a temperature difference between a first accumulator cell and a second accumulator cell is determined and compared with a predefined threshold value. Alternatively or in addition, an undershooting of a predefined temperature difference between a refrigerant of the air-conditioning system and an ambient air flowing around the condenser may be determined. In this case, it is for example possible for the ambient air to be measured and compared with refrigerant temperatures within the air-conditioning system determined by measurement or empirically. In this case, on an empirical basis and in a manner dependent on a present operating state of the high-voltage accumulator, it is possible to predict whether a resultant refrigerant flow for ensuring an adequate dissipation of heat from the high-voltage accumulator will necessitate measures according to the invention. The above-stated measures provide advantageous findings which are easy to determine in terms of measurement technology, and in response to which a reaction according to the invention can advantageously be implemented.

It is preferably the case that, in order to reduce heat losses, at least a part of the refrigerant flow is conducted so as to bypass at least a part of the condenser of the air-conditioning system. In other words, a refrigerant flow is branched off at a location such that the branched-off part of the refrigerant flow does not flow through the entire length of the condenser. In particular, it is possible here for a part of the refrigerant flow to be conducted so as to bypass the entire condenser. This has the advantage that the condenser can be constructed without valves for branching off a part of the refrigerant flow, which reduces the component costs for the condenser. Alternatively, it is possible for the entire refrigerant flow to be conducted so as to bypass a part of the condenser. For this purpose, a valve arranged in the condenser may ensure that a bypass past the condenser can be of a short design which saves structural space.

An alternative or additional reduction of heat losses is realized according to the invention by way of a reduction of an ambient air flow through the compressor. In other words, the ambient fluid which dissipates the heat from the condenser is influenced such that the heat dissipation is reduced and thus the condenser temperature is increased. For example, the ambient air flowing to the condenser may be influenced by way of variable air-guiding means such that a reduced mass flow of ambient air flows to and/or through the condenser surface. If the condenser is arranged downstream of air-guiding means already provided for other purposes, it is thus possible according to the invention for a control signal for the actuation of the air-guiding means to be generated in response to an identification of an excessively low refrigerant flow through the evaporator for the high-voltage accumulator, in response to which control signal the throughput of ambient air through the condenser is reduced by way of the air-guiding means which are installed in any case. In this way, no additional hardware is required to realize the method according to the invention.

A further step according to the invention for reducing heat losses within the condenser consists in an additional infeed of heat into the condenser. This may be realized for example by way of a heating element which is operated for example using electrical or chemically stored energy (for example in the form of a fuel). In particular, the use of electrical energy makes it possible here to realize a simple and reliable design and inexpensive construction and operation. It is preferably also possible for waste heat generated in the transportation means to be used for heating the condenser. For example, for this purpose, a thermal coupling action between the condenser and a circuit for waste-heat dissipation may be temporarily improved. An example of a circuit for waste-heat dissipation is the cooling water circuit for dissipating the waste heat of a drive assembly of a transportation means. In this case, the thermal coupling action may simply be realized by virtue of the spacing between a section of the circuit and the condenser being reduced. Alternatively or in addition, an insulator situated between the circuit and the condenser may be temporarily removed or reduced. For example, it would be possible for a tank situated between the circuit and the condenser to be flooded with a heat-transporting fluid (for example water) in order to increase the thermal coupling action. Alternatively or in addition, it is possible for a cooling water flow through a heat exchanger, which is thermally coupled to the condenser, of the cooling water circuit of the transportation means to be increased. In other words, it would be possible for the cooling water flow through the heat exchanger to be increased by virtue, for example, of a bypass past the heat exchanger being shut off, and thus the entire cooling water flow duct that passes through the cooling water circuit then also flowing through the heat exchanger. According to the invention, the above-stated measures for the additional infeed of heat reduce the heat loss balance within the condenser and, in the presence of low ambient temperatures, lead to a more suitable temperature difference in relation to the condenser.

It is furthermore preferable for the air-conditioning system used according to the invention to additionally be used for influencing the climate in an occupant compartment of the transportation means. In other words, two parallel branches of the refrigerant circuit are used in order, on the one hand, to influence the interior compartment air or the temperature thereof and, on the other hand, to effect cooling according to the invention of the high-voltage accumulator of the transportation means. This permits an inexpensive implementation of the method according to the invention, and reduces the weight and structural space for the cooling of the high-voltage accumulator.

According to a further aspect of the present invention, there is proposed a control unit for a transportation means, in particular a passenger motor vehicle, for optimizing the cooling of a high-voltage accumulator by way of an air-conditioning system of the transportation means. In other words, the control unit is set up to carry out the method according to the invention as described above. For this purpose, said control unit receives input variables for the purposes of identifying an excessively low refrigerant flow, in particular through the evaporator for the high-voltage accumulator. Said input variables may for example be measurement results or empirical characteristic variables which permit present or predictive temperature determination. Furthermore, according to invention, the control unit is set up to generate output variables in order to react to the input variables in accordance with the invention. Output variables refer to signals which are suitable for reducing heat losses within a condenser of the air-conditioning system and thus for increasing the refrigerant flow. For example, this may involve an actuation of a valve for diverting a refrigerant flow so as to bypass the condenser. Alternatively or in addition, actuators may be actuated for the purposes of adjusting variable air-guiding means. Finally, the output variables are alternatively or additionally suitable for triggering an infeed of heat into the condenser. This may be realized for example by actuation of switching means which supply electrical energy to an electrical heating element on the condenser. Alternatively or in addition, the output variables may actuate actuators which improve a thermal coupling action between a cooling water circuit and the condenser. Furthermore, it is alternatively or additionally possible for the output variables to permit an increase of a cooling water flow through a heat exchanger which is thermally coupled to the condenser, for example by virtue of valves of a bypass of the heat exchanger being correspondingly actuated.

Further details, features and advantages of the invention will emerge from the following description and from the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
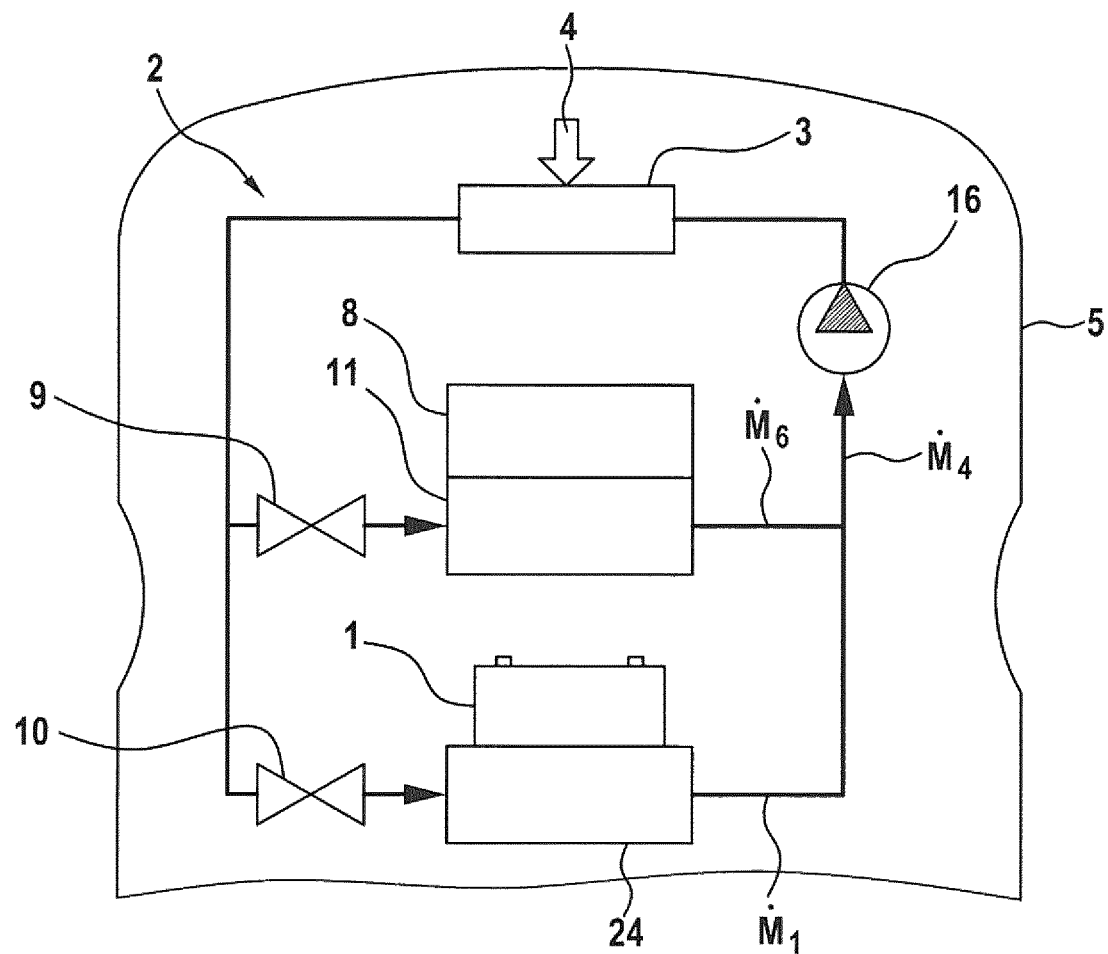
FIG. 1 shows a schematic plan view of a transportation means having an air-conditioning system which is set up for cooling a high-voltage accumulator.

FIG. 1 shows a plan view of components of a vehicle 5 in which an air-conditioning system 2 is set up for cooling a high-voltage accumulator 1. Ambient air 4 flows through a radiator grille of the vehicle 5 and, in so doing, dissipates heat from a condenser 3 of the air-conditioning system 2. Here, the air-conditioning system 2 comprises two parallel branches, wherein a mass flow $\dot{M}_1$ for the cooling of a high-voltage accumulator 1 by means of an evaporator 24 can be controlled by way of an expansion valve 10. In a second branch, a refrigerant flow $\dot{M}_6$ for the cooling of the air within the passenger compartment 8 by means of a second evaporator 11 can be controlled by way of a second expansion valve 9. The refrigerant flows $\dot{M}_1$, $\dot{M}_6$ are subsequently combined to form a common refrigerant flow $\dot{M}_4$, which is compressed by a compressor 16 and subsequently flows through the condenser 3 again. If a certain temperature difference between the ambient air 4 and the refrigerant of the air-conditioning system 2 within the condenser 3 is undershot, the refrigerant flow $\dot{M}_1$ is no longer great enough to maintain a predefined maximum temperature spread between the accumulator cells of the high-voltage accumulator 1. Furthermore, the general cooling power of the evaporator 24 for the high-voltage accumulator 1 may altogether fall short of the demanded cooling power. In conjunction with the following figures, measures will therefore be proposed by which, according to the invention, heat losses within the condenser 3 can be reduced.

Figure 2:
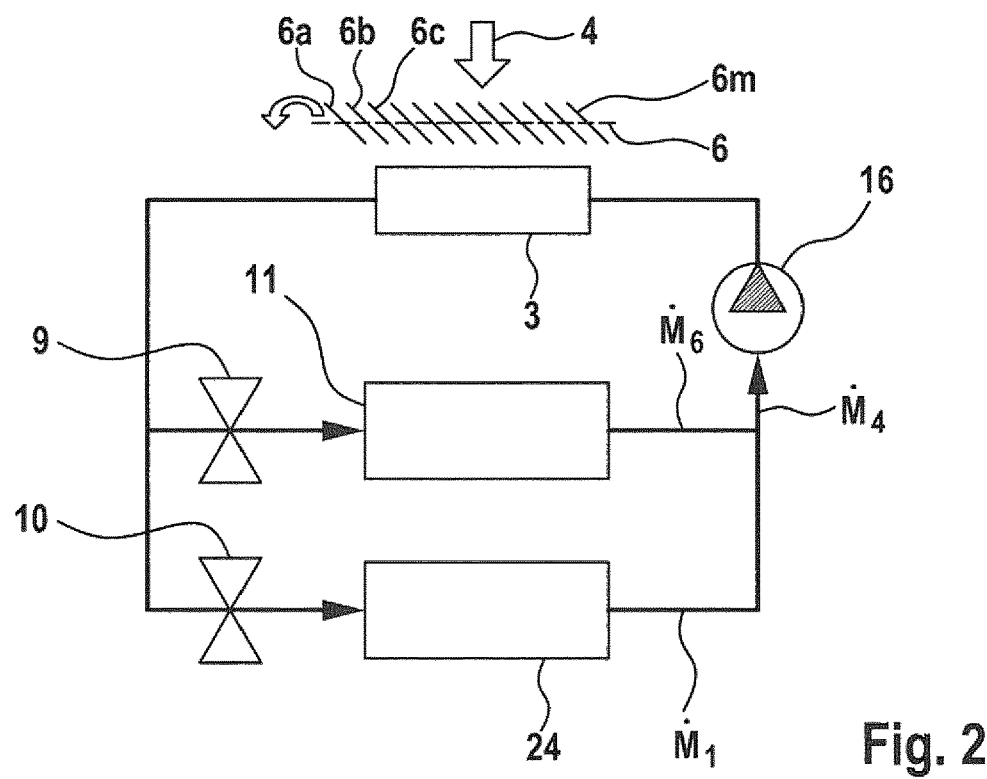
FIG. 2 shows a schematic plan view of a condenser which can be shielded by air-guiding means, with the air-guiding means open.

FIG. 2 shows a schematic diagram in which a condenser 3 can, by way of a multiplicity of adjustable lamellae 6a, 6b, 6c, . . . 6m as air-guiding means 6, be shielded with respect to ambient air 4 flowing to said condenser. For this purpose, the lamellae 6a, 6b, 6c, . . . 6m are arranged in front of the condenser 3 as viewed in the direction of travel, such that the ambient air 4 must imperatively flow through said lamellae before the ambient air 4 can dissipate heat from the condenser 3. The other components correspond to the features discussed in conjunction with FIG. 1.

Figure 3:
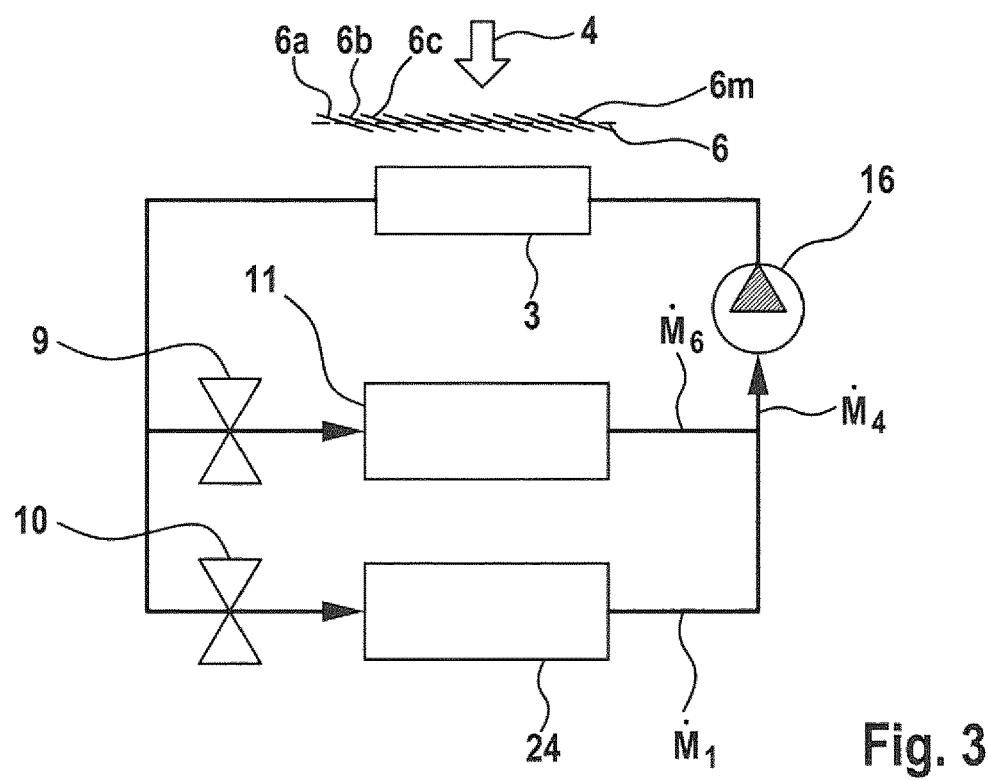
FIG. 3 shows a schematic plan view of an exemplary embodiment of a condenser which can be shielded by air-guiding means, with the air-guiding means closed.

FIG. 3 shows the arrangement illustrated in FIG. 2 after excessive heating and/or an excessive temperature spread has been detected within a high-voltage accumulator 1 (not illustrated). Therefore, according to the invention, a control signal has been transmitted which has led to an actuation of actuators (not illustrated) which have rotated the lamellae 6a, 6b, 6c, . . . 6m of the air-guiding means 6 so as to form a closed surface in order to shield the condenser 3 from the ambient air 4. In this way, less heat is extracted from the condenser 3, such that a temperature difference between the ambient air 4 and the refrigerant within the condenser 3 has, according to the invention, been artificially increased.

Figure 4:
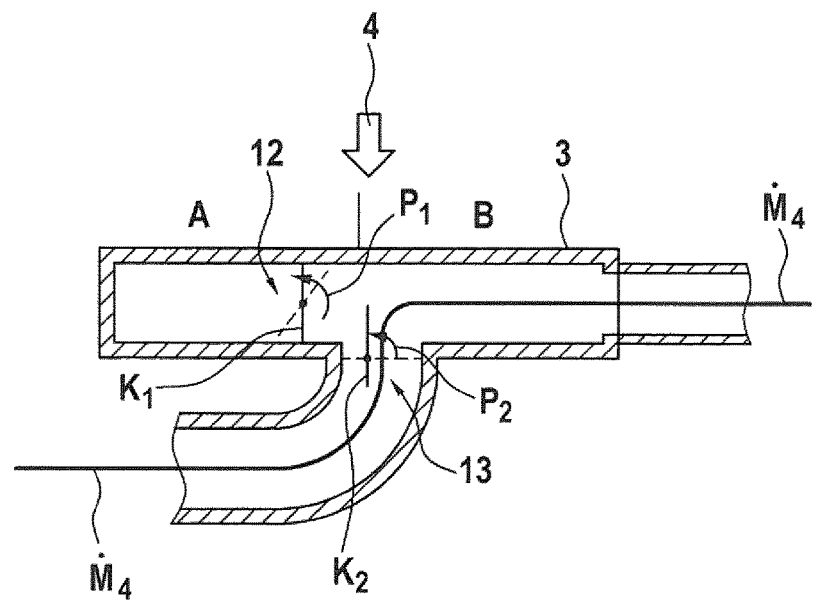
FIG. 4 shows a schematic diagram of an exemplary embodiment for conducting a refrigerant flow so as to bypass a part of a condenser.

FIG. 4 shows a schematic diagram for illustrating an alternative measure for reducing heat losses within the condenser 3. For this purpose, the condenser 3 has a first valve 12 by means of which a refrigerant flow $\dot{M}_4$ flowing into the condenser 3 can be conducted onward or blocked. By virtue of a first flap $K_1$ of the valve 12 being rotated in the direction of an arrow $P_1$, the valve 12, in the illustrated position, prevents the mass flow $\dot{M}_4$ from flowing through the part A of the condenser 3, such that only a part B of the condenser 3 is flowed through by the refrigerant flow $\dot{M}_4$. The refrigerant flow $\dot{M}_4$ is, by way of a second flap $K_2$ of a second valve 13, conducted out of the condenser 3 before it can enter the part A of the condenser 3. For this purpose, the second flap $K_2$ of the second valve 13 has been rotated in the direction of the arrow $P_2$, so as to open up an outlet at the end of the part B of the condenser 3. Ambient air 4 flowing to the condenser 3 will thus lead to a dissipation of heat only from the refrigerant flowing through the part B, such that the power of the condenser 3 is, according to the invention, reduced.

Figure 5:
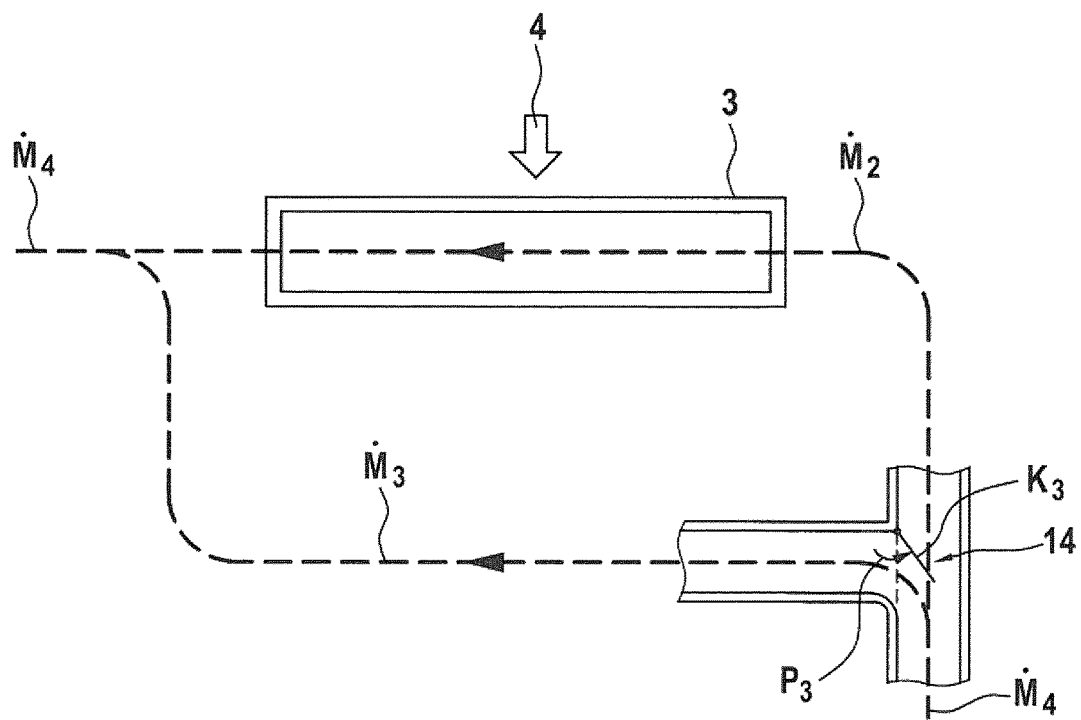
FIG. 5 shows a schematic diagram of an exemplary embodiment for conducting a part of a refrigerant flow so as to bypass the condenser.

FIG. 5 schematically shows an alternative construction for the control of the refrigeration power of the condenser 3. A refrigerant flow $\dot{M}_4$ is, by way of a valve 14, conducted partially through a condenser 3 of an air-conditioning system 2 designed in accordance with the invention. Therefore, ambient air 4 cools a mass flow $\dot{M}_2$ flowing through the condenser 3, whereas a mass flow $\dot{M}_3$, that has been branched off by means of the valve 14, and its flap $K_3$ that has been pivoted in the direction of the arrow $P_3$, flows through a bypass past the condenser 3 and is merged with the mass flow $\dot{M}_2$ again only downstream of the condenser 3. By virtue of the refrigeration power of the condenser 3 being reduced in this way, it is achieved as a result that a temperature difference between the ambient air 4 and a refrigerant flowing through the air-conditioning system 2 is increased.

Figure 6:
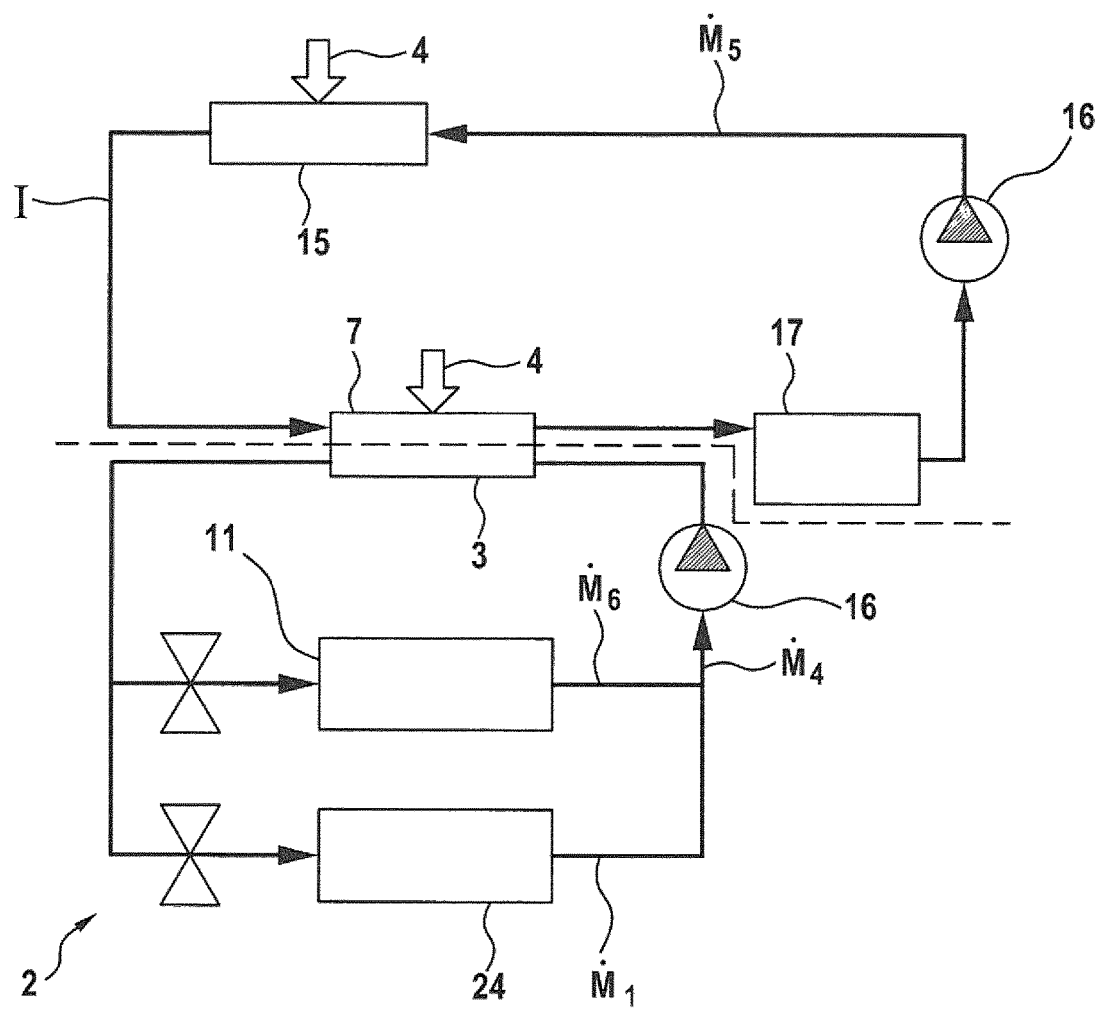
FIG. 6 shows a schematic diagram of an exemplary embodiment, showing the use of a cooling water circuit in the reduction of heat losses.

FIG. 6 schematically shows an alternative or additional measure according to the invention for reducing an extraction of heat from the condenser 3. This involves a cooling water circuit I in which a cooling water flow $\dot{M}_5$ is recirculated by way of a water pump 16. In this case, the cooling water flows through a low-temperature cooler 15 in which it releases heat to the ambient air 4. The cooled cooling water subsequently flows through a heat exchanger 7 in the form of a water-cooled condenser, by means of which, according to the invention, a section of the cooling water circuit I is thermally coupled to the condenser 3 of an air-conditioning system 2. In this case, the cooling water flow $\dot{M}_5$ releases residual heat to the refrigerant within the condenser 3. Subsequently, the cooling water flow $\dot{M}_5$ flows in the intended manner through various coolers (for example coolers of a drive engine, charge-air coolers, various low-temperature coolers) which are symbolically summarized by a unit 17. The cooling water circuit I is closed by virtue of the cooling water flow $\dot{M}_5$ subsequently flowing through the water pump 16 again. For regulation of the heat transfer between the cooling water circuit I and the condenser 3, various measures are conceivable, wherein the following listing of possible examples is not intended to be exhaustive. One possibility consists in a reduced cooling water flow $\dot{M}_5$ being caused to flow through the heat exchanger 7. This may be realized for example by way of a regulable bypass (not illustrated) which bypasses the heat exchanger 7. In this case, for the heat exchanger 7, an arrangement corresponding to the arrangement illustrated in FIG. 5 may be used. Alternatively, for the heat exchanger 7, an arrangement corresponding to the arrangement illustrated in FIG. 4 could also be used. Alternatively, a thermal coupling action between the heat exchanger 7 and the condenser 3 may be increased by virtue of a thermal insulation between the two being temporarily reduced. For example, a tank arranged between the heat exchanger 7 and the condenser 3, which tank was previously empty or at least had a relatively low fill level, may be filled with a heat-conducting liquid (for example water). Alternatively, the spatial proximity between the heat exchanger 7 and the condenser 3 can be reduced for example by way of an actuating motor (not illustrated), such that the thermal coupling action between the two components is increased. Alternatively or in addition, the arrangement illustrated in FIG. 6 may be combined with the arrangements illustrated in FIGS. 2 to 5. In other words, in addition to the use of the cooling water circuit I, an ambient air flow 4 may be controlled by means of air-guiding means 6, and/or the heat-extraction power of the condenser 3 may be reduced by way of suitable bypasses (see FIGS. 4 and 5).

Figure 7:
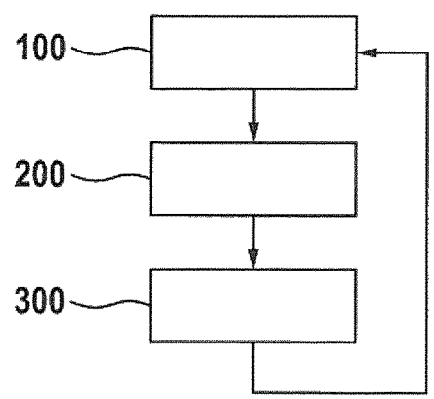
FIG. 7 shows a flow diagram illustrating steps of an exemplary embodiment of a method according to the invention.

FIG. 7 shows a flow diagram illustrating steps of an exemplary embodiment of a method according to the invention. In step 100, an exceedance of a predefined temperature and/or of a predefined temperature spread is determined. Alternatively or in addition, an undershooting of a predefined temperature difference between a refrigerant of the air-conditioning system and ambient air flowing around the condenser is detected. Subsequently, in step 200, it is identified if an excessively low refrigerant flow through an evaporator for the high-voltage accumulator is to be expected from this, or already exists. In this case, step 200 may furthermore involve operating characteristic variables of the transportation means and/or of the high-voltage accumulator, and for example also an evaluation of a usage history of a user of the transposition means. In summary, in step 200, a requirement for the refrigerant flow through the evaporator in the region of the high-voltage accumulator to be increased is determined. Subsequently, in step 300, provision is made for the heat losses within the condenser of the air-conditioning system to be reduced in order to increase the excessively low refrigerant flow.

Even where aspects according to the invention and advantageous embodiments have been described in detail on the basis of the exemplary embodiments discussed in conjunction with the appended figures of the drawing, modifications and combinations of features of the present exemplary embodiments can be realized by a person skilled in the art without departing from the domain of the present invention, the scope of protection of which is defined by the appended claims.

LIST OF REFERENCE SIGNS

1 High-voltage accumulator
2 Air-conditioning system
3 Condenser
4 Ambient air
5 Vehicle
6 Air-guiding means
6a, 6b, . . . Lamellae
7 Water-cooled condenser/heat exchanger
8 Passenger compartment
9 Expansion valve
10 Expansion valve
11 Evaporator
12 Valve
13 Valve
14 Valve
15 Low-temperature cooler
16 Compressor/(water) pump
17 Cooler
24 Evaporator
100 Step
200 Step
300 Step
A/B Parts of the condenser
I Cooling water circuit
K Flap
M Mass flow/refrigerant flow
P Arrows The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for optimizing the cooling of a high-voltage accumulator using an air-conditioning system in a vehicle, wherein the method comprises the acts of:
   identifying a low refrigerant flow through an evaporator for the high-voltage accumulator; and
   reducing, in response to the low refrigerant flow, heat losses within a condenser of the air-conditioning system in order to increase the refrigerant flow,
   wherein reducing the heat losses comprises providing an additional infeed of heat into the condenser.

2. The method as claimed in claim 1, wherein the low refrigerant flow is identified in response to a determination of at least one of:
   an exceedance of a predefined temperature within the high-voltage accumulator,
   an exceedance of a predefined temperature spread within the high-voltage accumulator, and
   an undershooting of a predefined temperature difference between a refrigerant of the air-conditioning system and ambient air flowing around the condenser.

3. The method as claimed in claim 1, wherein said reducing heat losses comprises conducting at least a part of the refrigerant flow so as to bypass at least a part of the condenser.

4. The method as claimed in claim 2, wherein said reducing heat losses comprises conducting at least a part of the refrigerant flow so as to bypass at least a part of the condenser.

5. The method as claimed in claim 3, wherein said conducting at least a part of the refrigerant flow so as to bypass at least a part of the condenser comprises one of:
   conducting a part of the refrigerant flow so as to bypass the entire condenser, and
   conducting the entire refrigerant flow so as to bypass a part of the condenser.

6. The method as claimed in claim 4, wherein said conducting at least a part of the refrigerant flow so as to bypass at least a part of the condenser comprises one of:
   conducting a part of the refrigerant flow so as to bypass the entire condenser, and
   conducting the entire refrigerant flow so as to bypass a part of the condenser.

7. The method as claimed in claim 1, wherein said reducing heat losses comprises reducing an ambient air flow through the condenser.

8. The method as claimed in claim 7, wherein said reducing the ambient air flow comprises actuating variable air-guiding means which are arranged upstream of the condenser in the forward direction of the vehicle.

9. The method as claimed in claim 1, wherein providing the additional infeed of heat comprises increasing a thermal coupling action between the condenser and a circuit for waste-heat dissipation.

10. The method as claimed in claim 9, wherein providing the additional infeed of heat comprises increasing a cooling water flow through a region, which is thermally coupled to the condenser, of a heat exchanger of the cooling water circuit of the vehicle.

11. The method as claimed in claim 1, wherein providing the additional infeed of heat comprises increasing a cooling water flow through a region, which is thermally coupled to the condenser, of a heat exchanger of the cooling water circuit of the vehicle.

12. The method as claimed in claim 1, wherein the air-conditioning system is additionally used for influencing the climate in an occupant compartment of the vehicle.

13. A control unit for a vehicle configured to optimize the cooling of a high-voltage accumulator using an air-conditioning system of the vehicle, wherein the control unit is configured to:
receive input variables;
identify a low refrigerant flow through an evaporator for the high-voltage accumulator based on said input variable; and
reduce, in response to identifying the low refrigerant flow, heat losses within a condenser of the air-conditioning system in order to increase the refrigerant flow,
wherein the control unit is configured to reduce heat losses by providing an additional infeed of heat into the condenser, wherein the additional infeed of heat is provided by at least one of:
increasing a thermal coupling action between the condenser and a circuit for waste-heat dissipation, and
increasing a cooling water flow through a region, which is thermally coupled to the condenser, of a heat exchanger of the cooling water circuit of the vehicle.

14. The control unit as claimed in claim 13, wherein the control unit is configured to identify the low refrigerant flow in response to a determination of at least one of:
an exceedance of a predefined temperature within the high-voltage accumulator,
an exceedance of a predefined temperature spread within the high-voltage accumulator, and
an undershooting of a predefined temperature difference between a refrigerant of the air-conditioning system and ambient air flowing around the condenser.

15. The control unit as claimed in claim 13, wherein the control unit is configured to reduce heat losses by conducting at least a part of the refrigerant flow so as to bypass at least a part of the condenser.

16. The control unit as claimed in claim 13, wherein the control unit is configured to conduct at least a part of the refrigerant flow so as to bypass at least a part of the condenser by one of:
conducting a part of the refrigerant flow so as to bypass the entire condenser, and
conducting the entire refrigerant flow so as to bypass a part of the condenser.

17. The control unit as claimed in claim 13, wherein the control unit is configured to reduce heat losses by reducing an ambient air flow through the condenser, wherein the ambient air flow is reduced by actuating variable air-guiding means which are arranged upstream of the condenser in the forward direction of the vehicle.

* * * * *